United States Patent
Maeda et al.

(10) Patent No.: US 6,492,628 B2
(45) Date of Patent: Dec. 10, 2002

(54) HEATER SUPPORTING STRUCTURE AND HEATING FURNACE FOR BENDING A GLASS SHEET

(75) Inventors: Kenji Maeda, Kanagawa; Kimio Kitamura, Osaka, both of (JP)

(73) Assignees: Asahi Glass Company, Limited, Tokyo (JP); Teitokusha Co., Ltd., Osaka (JP)

( * ) Notice: Subject to any disclaimer, the term of this patent is extended or adjusted under 35 U.S.C. 154(b) by 0 days.

(21) Appl. No.: 09/930,192

(22) Filed: Aug. 16, 2001

(65) Prior Publication Data

US 2002/0005404 A1 Jan. 17, 2002

Related U.S. Application Data

(63) Continuation of application No. PCT/JP00/08927, filed on Dec. 15, 2000.

(30) Foreign Application Priority Data

Dec. 16, 1999 (JP) .............................. 11-357766

(51) Int. Cl.[7] .............................. H05B 3/06; C03B 5/02
(52) U.S. Cl. ..................... 219/520; 219/536; 373/27
(58) Field of Search ............................... 219/520, 531, 219/532, 536, 538, 542; 373/5, 27, 109, 117, 118, 119, 127, 128, 131, 134; 65/106, 273, 107, 162, 104

(56) References Cited

FOREIGN PATENT DOCUMENTS

| JP | 125421 | 9/1980 |
|---|---|---|
| JP | 60496 | 4/1986 |
| JP | 3-45594 | 9/1991 |
| JP | 6-342687 | 12/1994 |
| JP | 7-296957 | 11/1995 |
| JP | 10-279324 | 10/1998 |
| JP | 11-199254 | 7/1999 |
| WO | WO 98/45214 | 10/1998 |

Primary Examiner—Tu Ba Hoang
(74) Attorney, Agent, or Firm—Oblon, Spivak, McClelland, Maier & Neustadt, P.C.

(57) ABSTRACT

A heater supporting structure includes heaters comprising plate-shaped electrical resistance heating elements and power applying portions for energizing the electrical resistance heating elements, mounts for mounting the electrical resistance heating elements, and first insulative supporters and second insulative supporters, the supporters being provided on the mounts with a certain distance and supporting edges of the electrical resistance heating elements, and the electrical resistance heating elements are formed in a shape so as to project toward the mounts and are provided apart from the mounts.

6 Claims, 4 Drawing Sheets

HEATER SUPPORTING STRUCTURE AND HEATING FURNACE FOR BENDING A GLASS SHEET

This application is a continuation of PCT/JP00/08927, Dec. 15, 2000.

TECHNICAL FIELD

The present invention relates to a heater supporting structure and a heating furnace for bending a glass sheet, in particular to a heater supporting structure and a heating furnace for bending a glass sheet, which are suited to bend a glass sheet for laminated glass to be used for the windshield of an automobile.

BACKGROUND ART

The windshield of an automobile is prepared by putting a glass sheet cut in certain size and shape on a mold and heating the glass sheet to a temperature close to a softening point (550° C.–650° C.) in a heating furnace to be bent in a certain shape.

The heating furnace for heating the glass sheet has an inner space divided into a plurality of zones, and the respective zones are provided with heaters segmented into a plurality of blocks. The respective heaters are independently subjected to temperature control and are controlled to provide certain temperature distributions in the respective blocks. The glass sheet is heated by the segmented heaters to have temperature distributions formed in a glass surface, being bent into the certain shape.

By the way, conventional ceiling heaters, which are provided on the ceiling surfaces of the respective zones in the heating furnace, are configured by providing a plurality of cylindrical heating elements on supporting frames side by side.

However, the ceiling heaters, which are conventionally configured by providing cylindrical heating elements side by side, have created a problem in that the stay of heat causes the heat to be easily transferred among the respective heating elements, and clear temperature distributions are difficult to be formed.

It is object of the present invention to solve this problem and to provide a heater supporting structure superior in temperature control and a heating furnace for bending a glass sheet capable of improving temperature distribution generating properties therein.

DISCLOSURE OF INVENTION

The present invention provides a heater supporting structure including heaters comprising plate-shaped electrical resistance heating elements and power applying portions for energizing the electrical resistance heating elements, mounts for mounting the electrical resistance heating elements, and first insulative supporters and second insulative supporters, the supporters being provided on the mounts with a certain distance and supporting edges of the electrical resistance heating elements, characterized in that the electrical resistance heating elements are formed in a shape so as to project toward the mounts and are provided apart from the mounts.

The present invention also provides the following modes. Specifically, there is provided the heater supporting structure, wherein a first supporter, a second supporter and an electrical resistance heating element form one unit, and a plurality units are provided so as to be side by side. Additionally, there is provided the heater supporting structure, wherein two adjacent electrical resistance heating elements are commonly supported by a supporter, and the plurality of units are delimited by the supporters. Additionally, there is provided the heater supporting structure as defined earlier, wherein the electrical resistance heating elements have elasticity, and the edges of the electrical resistance heating elements are supported by the first and second supporters by repulsive force caused by curvature. Further, there is provided the heater supporting structure as defined earlier, wherein each of the electrical resistance heating elements is made of a metallic sheet having a plurality of slits provided with certain intervals therein to provide a snaky resistance wire.

Furthermore, there is provided a heating furnace for bending a glass sheet, wherein a mold for having a glass sheet put thereon is provided, and the glass sheet is heated by a heating device to be bent in a certain shape, characterized in that the heating device includes the heater supporting structure as stated earlier.

BEST MODE FOR CARRYING OUT THE INVENTION

Now, a preferred embodiment of the heater supporting structure and the heating furnace for bending a glass sheet according to the present invention will be described in detail in reference to the accompanying drawings.

Figure 1:
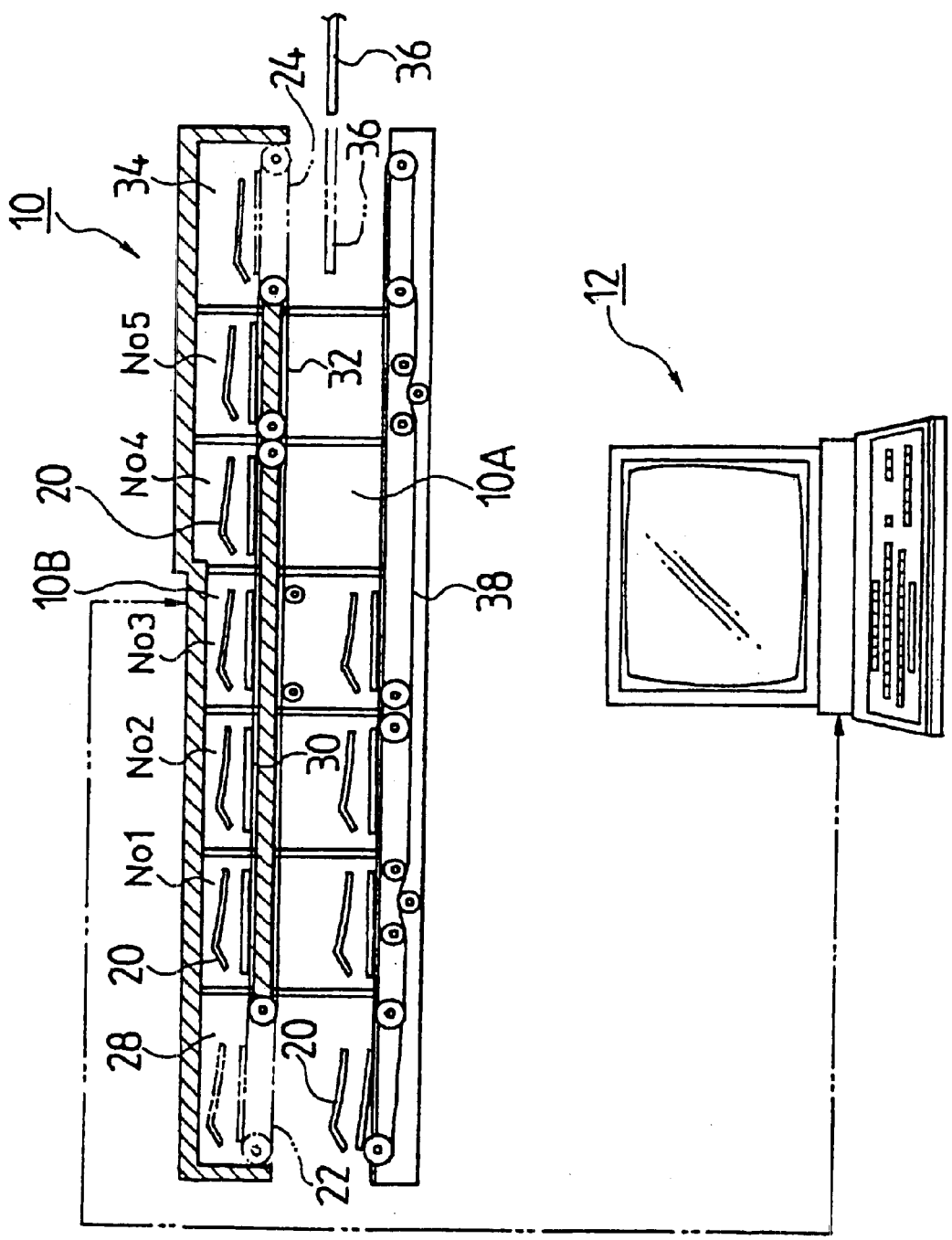
FIG. 1: It is a view of the entire structure of an apparatus for bending a glass sheet for laminated glass.

FIG. 1 is a schematic view of the entire structure showing an example of the apparatus for bending a glass sheet for laminated glass, with heaters according to the present invention applied thereto. In this example, the apparatus 10 for bending a glass sheet for laminated glass is of two stories and has a first story and a second story connected by elevators 22, 24 at both ends. The first story in the apparatus 10 for bending a glass sheet for laminated glass forms a return pass 10A, and the second story of the apparatus forms a heating furnace The heating furnace 10B is divided into five zones along the transferring direction of a glass sheet. Specifically, the furnace is divided into heating zones No. 1–No. 2 for heating a glass sheet from room temperature up to a temperature close to a softening temperature, forming zones No. 3–No. 4 for actually bending the glass sheet, and an annealing zone No. 5 for annealing the bent glass sheet. The respective zones of the heating furnace 10B have the heaters provided on ceiling surfaces, floor surfaces and lateral surfaces, and the respective zones are independently subjected to temperature control by a computer 12.

A glass sheet before bending (not shown) is put on a mold 20 on the elevator 22, and then the glass sheet as well the mold 20 as is transferred to a standby chamber 28 by upward displacement of the elevator 22. Then, the glass sheet as well as the mold 20 is moved, in tact transfer, through the heating zones No. 1–No. 2 and the forming zones No. 3–No. 4 by a transferring conveyor 30, and the glass sheet is heated to be softened during the transfer.

The molds 20 with a glass sheet put thereon are formed in a ring shape along the contour shape of a glass sheet to be bent. Thus, when a glass sheet is heated to be softened, the glass sheet is bent into a shape in conformity with the mold 20 by gravity.

The bent glass sheet is transferred into the annealing zone No. 5 by a transferring conveyor 32, and the bent glass sheet is transferred into an outlet chamber 34 after having been cooled down to a certain temperature there. The glass sheet transferred into the outlet chamber 34 is lowered by the elevator 24, and the glass sheet is transferred to an unshown subsequent step by transferring movement of an arm 36 for removal after having been put on the arm 36.

The mold 20 with the glass sheet removed therefrom is transferred in the direction opposite to the above-mentioned path by a transferring conveyor 38 provided in the first story and is carried to the location of the elevator 22. Then, the mold is waiting until a glass sheet before bending is put on the mold on the elevator 22.

By the way, when a glass sheet has been transferred into the heating zone No. 1, the elevator 22 lowers to the first story, and the elevator is waiting at that position until a mold 20 transferred by the transferring conveyor 38 is put on the elevator.

Figure 2:
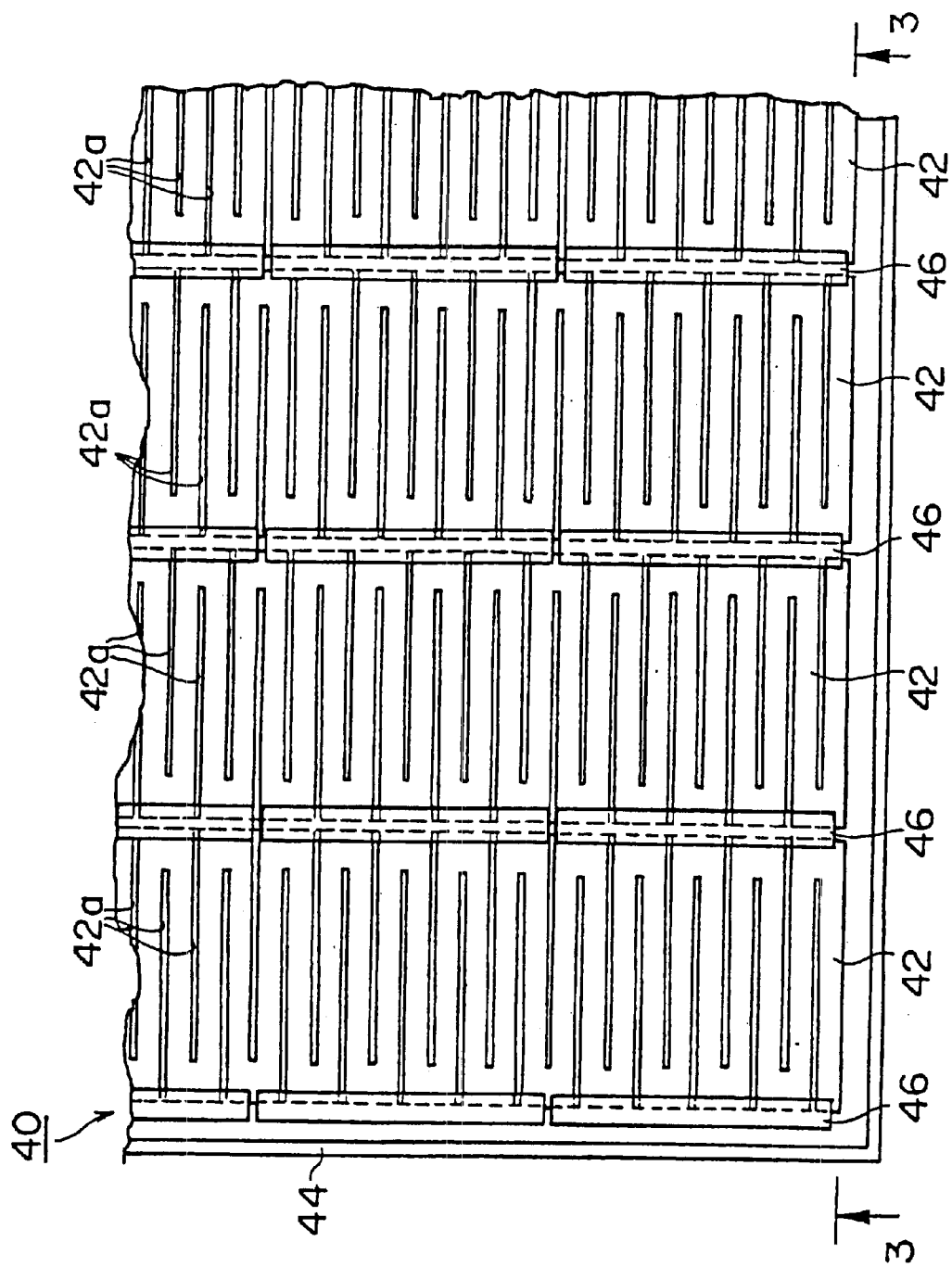
FIG. 2: It is a view as partly seeing ceiling heaters from downwardly.

FIG. 2 is a view as partly seeing ceiling heaters 40 provided on the ceiling of the respective zones No. 1–No. 5 of the heating furnace 10B from downwardly. As shown in this figure, the ceiling heaters 40 are formed by providing a plurality of electric resistance heating elements 42, 42 on supporting frames 44 as mounts side by side. The supporting frames 44 are fixedly provided on the ceilings of the heating furnace 10B.

Figure 3:
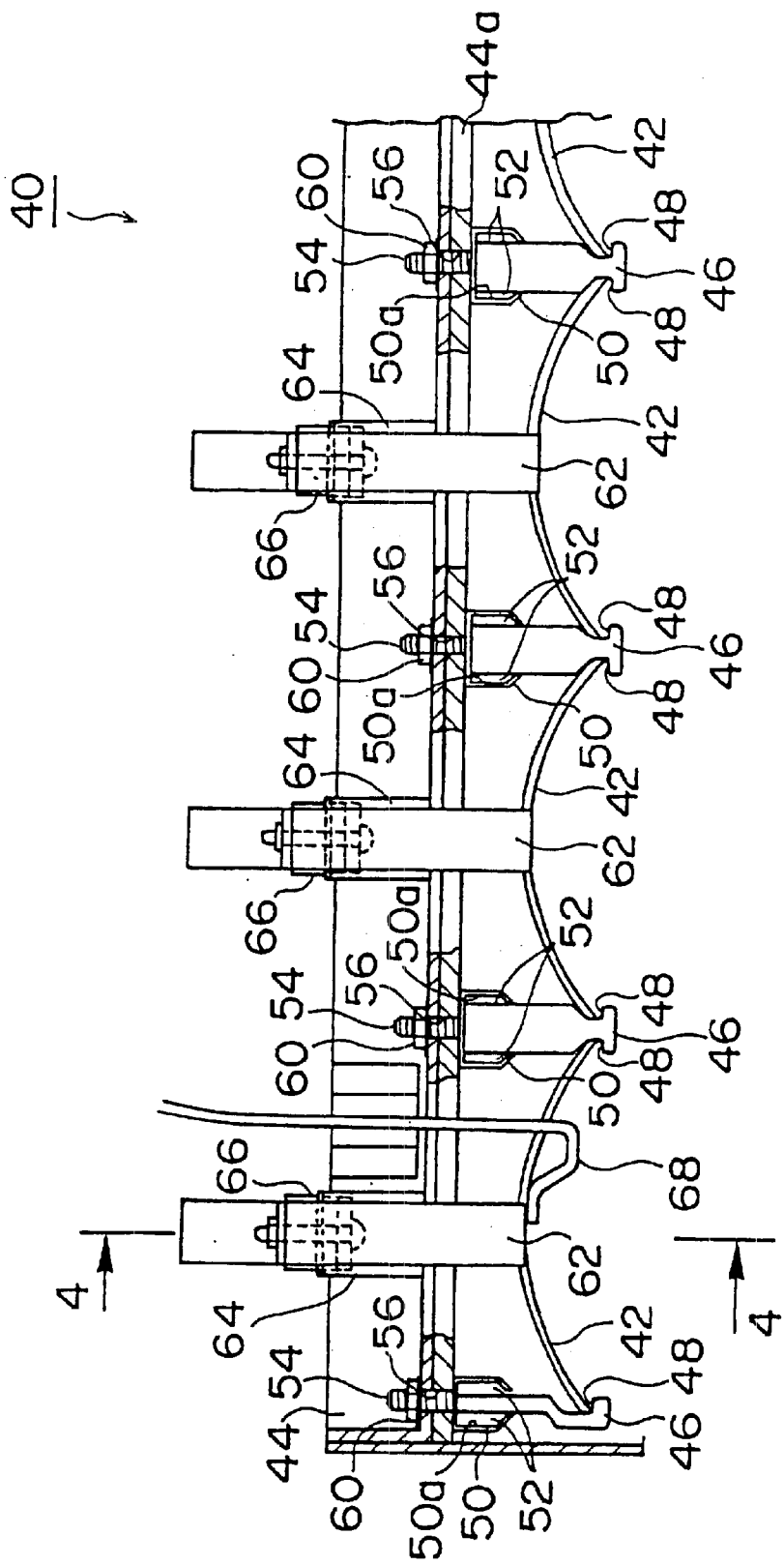
FIG. 3: It is a cross-sectional view taken along the line 3—3 of FIG. 2.

FIG. 3 is a cross-sectional view taken along the line 3—3 of FIG. 2. The electrical resistance heating elements 42 forming the ceiling heaters 40 are made of a material having electrical resistance and elasticity, such as Fe—Cr—Al type alloy and nickel chromium alloy, the heating elements have a plate-like shape, and the heating elements are formed in an arc shape (or formed in a curved shape, such as a parabolic shape) to project toward the supporting frames 44 at least where the heating elements are supported as the ceiling heaters. The electrical resistance heating elements 42 have a plurality of slits 42a, 42a formed therein to alternately extend from the opposite ends thereof with certain intervals, providing snaky circuits.

Additionally, the respective electrical resistance heating elements 42 are mounted to the supporting frames 44 through supporting insulators 46, which are made of a ceramic material or another material to have electrical insulating properties. The supporting insulators 46 are provided between adjoining electrical resistance heating elements 42, 42 to support the electrical resistance heating elements 42, 42 at the opposite lateral sides thereof throughout the entire length. The supporting insulators 46 are formed in a plate-like shape and have the opposite lateral portions on the respective leading edges formed with supporting grooves 48, 48 along the longitudinal direction (each of the supporting insulators 46 that locate at both ends of the supporting frames 44 has only one lateral surface formed with a supporting groove 48). The respective electrical resistance heating elements 42, 42 have the opposite lateral portions thereof engaged with the supporting grooves 48, 48 of adjoining supporting insulators 46, 46, and adjoining electrical resistance heating elements 42, 42 are supported in a separate state.

In that manner, an electrical resistance heating element 42 and two supporting insulators 46 supporting the electrical resistance heating element form one unit, and the respective heating zones have a plural number of the units provided therein. The respective electrical resistance heating elements 42 are supported by the supporting grooves 48 with the use of repulsive force caused by curvature, and the respective electrical resistance heating elements are provided so that the convex shape of the respective electrical resistance heating elements caused by the curvature (the cross-sectional shape of the respective electrical resistance heating elements 42) is located on the side of the supporting frames 44. The electrical resistance heating elements 42 can be curved in an arc shape along the longitudinal direction of the slits 42a as in this example since the heating elements have a smaller thickness in comparison with the area and are formed of a metallic sheet having the plural slits 42a. Thus, the electrical resistance heating elements can be firmly supported, maintaining the curved shape. Additionally, the heat generated from the respective electrical resistance heating elements 42 can be prevented from being transferred directly to the ceiling surfaces 44a of the supporting frames 44 since certain spaces are ensured between the respective electrical resistance heating elements 42 and the ceiling surfaces 44a. As a result, the heat can be restrained from staying around peripheral structures of the resistance heating elements 42 (the supporting frames 44, the ceiling surfaces 44a thereof and other members), allowing the amount of radiant heat from the respective heaters to be modified with good response.

The respective supporting insulators 46 are detachably mounted to the supporting frames 44 through holders 50, 50. The supporting insulators 46 have upper portions formed with mounting portions 52, 52 for connection with the holders 50, 50. The mounting portions 52, 52 are formed so as to project from the opposite lateral sides of the upper portions of the supporting insulators 46. The supporting insulators 46 are engaged with openings 50a of the holders 50, 50 having the same cross-sectional shape as the mounting portions 52, 52, being mounted to the holders 50, 50.

The holders 50 have bolts 54 integrally fixed to upper surfaces, the bolts 54 are passed through bolt holes 56 formed in the ceiling surfaces 44a of the supporting frames 44, and the holders 50 are mounted to the supporting frames 44 by fixing the bolts with nuts 60.

Figure 4:
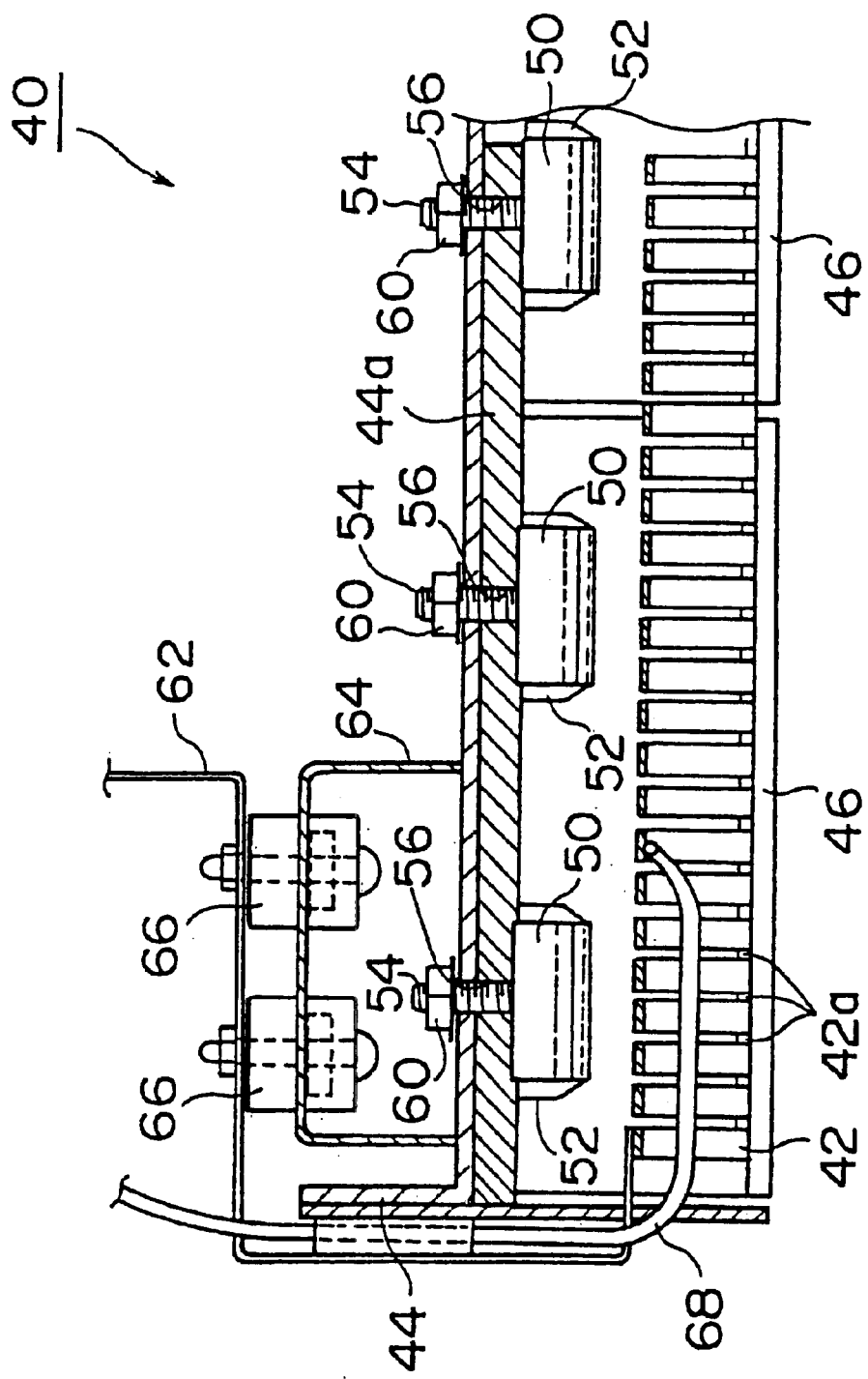
FIG. 4: It is a cross-sectional view taken along the line 4-4 of FIG. 3.

By the way, FIG. 4 is a cross-sectional view taken along the line 4—4 of FIG. 3. Lead wires 62 are supported, through lead wire supporting insulators 66, 66, by lead wire supporting frames 64 integrally formed on the supporting frames 64. Both ends of the respective electrical resistance heating elements 42 are connected to lead wires 62, and the voltage to be applied through the lead wires 62 can be controlled to adjust the amount of heat generated from the respective electrical resistance heating elements 42.

In FIGS. 3 and 4, each of the electrical resistance heating elements 42 is provided with a temperature sensor 68. The voltage to be applied to each of the electrical resistance heating elements 42 is controlled based on a detection value by the temperature sensor 68.

The functions offered by the ceiling heaters in the apparatus for bending a glass sheet for laminated glass according to this embodiment thus constructed are as follows:

The ceiling heaters 40 provided in the respective zones No. 1–No. 5 in the heating furnace 10B provide certain temperature distributions in accordance with the shape of a glass sheet to be bent. Specifically, the respective ceiling heaters 40 provide temperature distributions in conformity with the shape of a glass sheet to be bent by independently controlling the temperatures of the respective electrical resistance heating elements 42, 42. The glass sheet is heated to be softened during the transfer through the respective zones No. 1–No. 5 of the heating furnace 10B with the certain temperature distributions provided therein, being bent into a shape in conformity with the mold with the glass sheet thereon.

Since respective electrical resistance heating elements 42, 42 are formed in a plate-like shape, the ceiling heaters 40 provide a structure where heat dissipation is good, and where heat is difficult to stay. Since adjoining electrical resistance heating elements 42, 42 are separated by adjoining supporting insulators 46, 46, the respective ceiling heaters 40 provide a structure wherein heat is unlikely to be transferred between adjoining electrical resistance heating elements 42, 42. Since the respective electrical resistance heating elements 42 is formed an arc shape so as to project toward the supporting frames 44, heat radiation can be locally focused on a glass sheet. Thus, the temperature distributions can be provided so as to have clear boundaries, accurately bending the glass sheet into a certain shape.

Additionally, the temperature distributions can be rapidly provided as desired with good response to a change in set temperatures since the respective ceiling heaters 40 have the structure where heat dissipation is good, and where heat is difficult to stay as stated earlier. As a result, even if glass sheets having different shapes to bend are sequentially transferred, the temperature distributions can be rapidly provided accordingly, improving productivity.

With respect to the embodiment stated earlier, there is shown the case wherein the heaters are utilized as heating furnace heaters for bending a glass sheet. However, the application of the present invention is not limited to that case, and the present invention can be utilized in various applications, wherein the respective heaters in heat groups provide temperature distributions. Although the example stated earlier utilizes the electrical resistance heating elements having a snaky shape, the present invention is not limited to that case, and it is clear that the electrical resistance heating elements may have another shape as long as the heating elements can be supported by insulators. In other words, how to provide the slits is not limited to the example, and the electrical resistance heating elements may be partly bent. The location where the heaters are provided in the heating furnace and the location of the heating zones may be properly determined, depending on user's purposes. Although the electrical resistance heating elements are mounted to the ceiling wall of the heating furnace through the supporting frames in the embodiment state earlier, the electrical resistance heating elements may be mounted directly to the ceiling surfaces of the heating furnace. In that case, the ceiling of the heating furnace serve as the mounts. Preferably, the electrical resistance heating elements are mounted to the supporting frames through the supporting frames since the distance between a glass sheet and the heaters can be adjusted.

INDUSTRIAL APPLICABILITY

In accordance with the present invention, the heating elements forming the ceiling heaters can be formed in a plate-like shape and be provided apart from the mounts to improve the heat dissipation of the heating elements, make it difficult for heat to stay and improve response. Additionally, the respective heating elements can be separated by the supporters to make it difficult for heat to be transferred among the heating elements. Further, the respective electrical resistance heating elements 42 can be formed in an arc shape so as to project toward the supporting frames 44, allowing heat radiation to be locally focused on a glass sheet. Thus, a clear temperature difference can be provided at the boundary between adjoining heating elements to generate accurate temperature distributions.

What is claimed is:

1. A heater supporting structure including heaters comprising plate-shaped electrical resistance heating elements and power applying portions for energizing the electrical resistance heating elements, mounts for mounting the electrical resistance heating elements, and first insulative supporters and second insulative supporters, the supporters being provided on the mounts with a certain distance and supporting edges of the electrical resistance heating elements, wherein the electrical resistance heating elements are formed in a shape so as to project toward the mounts and are provided spaced apart from the mounts.

2. The heater supporting structure according to claim 1, wherein a first supporter, a second supporter and an electrical resistance heating element form one unit, and a plurality units are provided so as to be side by side.

3. The heater supporting structure according to claim 2, wherein adjacent electrical resistance heating elements are commonly supported by a supporter, and the plurality of units are delimited by the supporters.

4. The heater supporting structure according to claim 1, wherein the electrical resistance heating elements have elasticity, and the edges of the electrical resistance heating elements are supported by the first and second supporters by repulsive force caused by curvature.

5. The heater supporting structure according to claim 1, wherein each of the electrical resistance heating elements is made a metallic sheet having a plurality of slits provided with certain intervals therein to provide a snaky resistance wire.

6. A heating furnace for bending a glass sheet, wherein a mold for having a glass sheet put thereon is provided, and the glass sheet is heated by a heating device to be bent in a certain shape, wherein the heating device includes the heater supporting structure defined in claim 1.

* * * * *